United States Patent Office 2,907,736
Patented Oct. 6, 1959

2,907,736
ESTERS OF POLYHYDRIC PHENOLS
Sylvan O. Greenlee, Racine, Wis., assignor to S. C. Johnson & Son, Inc., Racine, Wis.
No Drawing. Application June 30, 1955
Serial No. 519,277
18 Claims. (Cl. 260—22)

This invention relates to a new class of synthetic esters prepared from an unsaturated aliphatic acid and a polyhydric phenol. More particularly, this invention embraces a novel synthetic polyester prepared by esterifying with a long-chain unsaturated acid the phenolic hydroxyl groups of a polyhydric phenol which is the mixed ester of a polyhydric alcohol, a dicarboxylic acid, and an hydroxyaryl-substituted acid.

In the formulation of plasticized resin compositions, one of the greatest problems encountered is the manner of plasticizing and imparting air-drying or heat-conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its compatibility even though the product is inferior with respect to toughness, chemical resistance or flexibility.

Long-chain unsaturated acids containing at least about 10 carbon atoms constitute suitable plasticizers. These materials also are desirable because of the conversion characteristics imparted due to their unsaturation. The present invention embraces the production of the esters of such acids and polyhydric phenols. By esterifying the hydroxyl groups of the phenols with converting or plasticizing acids, products having a wide variety of properties may be obtained. Products of this type dissolved in an organic solvent form coating compositions which, on air drying, polymerize through the unsaturated groups to form flexible tack-free films.

The present compositions provide a chemical union in each molecule of the residue of one or more plasticizing acids or resin together with a polyhydric phenol which has been tailored to suit a particular need. The polyhydric phenol herein contemplated may be one of the compounds disclosed in the copending Greenlee application of even date, Serial No. 519,276, entitled "Polyhydric Phenols from Mixed Esters." These materials, having controlled molecular weights, hydroxyl content, softening points and solubility characteristics, are the mixed esters derived from a polyhydric alcohol, one or more dicarboxylic acids and a bis(hydroxyaryl)-substituted aliphatic acid. Such compositions may be prepared, for example by reacting 4 mols of 4,4-bis(hydroxyphenyl)-pentanoic acid with 2 mols of glycerol and 1 mol of succinic anhydride.

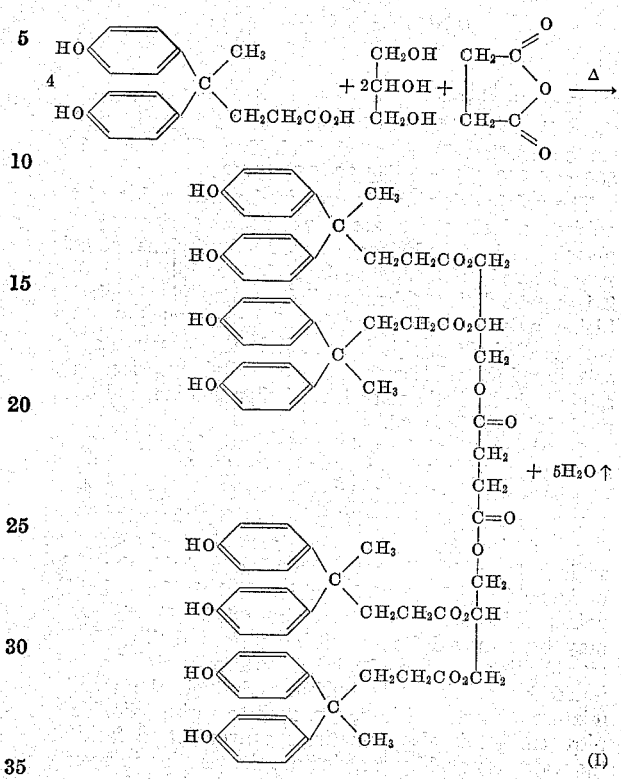

The aryloxy-substituted acid contemplated for use herein should have two hydroxyphenyl groups attached to a single carbon atom. The preparation of such an aryloxy acid is most conveniently carried out by condensing a keto-acid with the desired phenol. Experience in the preparation of bisphenol and related compounds indicated that the carbonyl group of the keto acid must be located next to a terminal carbon atom in order to obtain satisfactory yields. Prior applications, Serial Nos. 464,607 and 489,300, filed October 25, 1954, and February 18, 1955, respectively, disclose a number of illustrative compounds suitable for use as the aryloxy-substituted acid and methods of preparing the same. These materials, which are referred to for convenience as Diphenolic Acid or DPA, consist of the condensation products of levulinic acid and phenol, supstituted phenols, or mixtures thereof. It is to be understood that the phenolic nuclei of the Diphenolic Acid may be substituted with any groups which will not interfere with the esterification reactions. For example, the nuclei may be alkylated with alkyl groups having up to 5 carbon atoms as disclosed in Serial No. 489,300 or they may be halogenated.

The polybasic acids suitable for use in preparing the desired mixed esters are exemplified by phthalic anhydride, maleic anhydride, succinic anhydride and the corresponding acids, aconitic acid, azelaic acid, sebacic acid and the dimerized vegetable oil acids which are essentially 36-carbon aliphatic dibasic acids produced by the combination of two unsaturated 18-carbon vegetable oil acids through their olefin groups. Typical and illustrative of the dimerized vegetable oil acids is one marketed by Emery Industries, Inc. as their "Emery 955 Dimer Acid." Specifications given by the manufacturer on this dimer acid are: iodine value (modified Wijs method) 80–95, acid value 180–192, saponification value 185–195, and neutralization eqivalent 290–310. A typical formula representing the dimerization of linoleic acid including a proposed structure of the dimeric acid is given as follows:

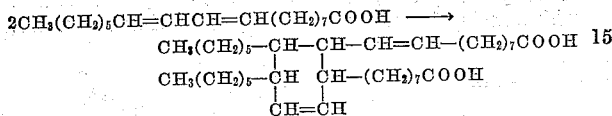

Further discussion on the preparation and structure of these dimeric acids is to be found in the following references: Bradley, T. F., et al., Ind. Eng. Chem. 32, 694, 802 and 963 (1940); and 33, 96 (1941).

The polyhydric alcohols used in the preparation of the subject mixed esters are illustrated by glycerol, the glycols such as ethylene glycol, polyethylene glycols, propylene glycol, polypropylene glycols, 1,4-butane-diol, 2,5-pentane-diol, 1,6-hexane-diol, neopentyl glycol; the higher polyols, such as erythritol, pentaerythritol, polypentaerythritols, sorbitol, mannitol; the unsaturated or substituted materials such as alpha-methyl glycoside, polyallyl alcohols, diethanolamine, triethanolamine, and tetramethylol cyclohexanol.

Esterification of the polyhydric alcohols with mixtures of Diphenolic Acid and polybasic acids is conveniently carried out by direct heating at temperatures of from 190–275° C. under conditions such that the water produced during the condensation is continuously removed as it is formed. Since the Diphenolic Acid, the polybasic acids, and the polyhydric alcohols have boiling points which are in all cases above 190° C., the water may be removed by permitting it to volatilize during esterification. Removal of the water may also be facilitated by continuously bubbling through the reaction mixture a stream of inert gas, such as carbon dioxide or nitrogen. It is also sometimes convenient to facilitate the water removal by carrying out the reaction in a vessel provided with condenser attached thereto through a water trap, adding a sufficient amount of a volatile, water-insoluble solvent to cause refluxing at the esterification temperature, continually removing the water by azeotropic distillation, and permitting the solvent to return to the reaction mixture after having dropped the water in the water trap.

The order of addition of the various ingredients, polybasic acids, Diphenolic Acid, and polyhydric alcohols, to each other may be varied. It is sometimes advantageous to vary this order of addition to obtain optimum results with the particular combination of ingredients used. In the art of high temperature esterification, it is sometimes advantageous to use certain esterification catalysts which are also suitable for use in the preparation of the subject compositions. Other methods of esterification, such as esterification of polyhydric alcohols with the acid chlorides or acid interchange of the high molecular weight acids with the acetates of the polyhydric alcohols, may be used.

A brief study of the prior art will show the present compositions to be unique. Heretofore, very few polyhydric phenols have been available wherein each hydroxyl group is attached to a different nucleus. Examples of such materials are bisphenol [bis(4-hydroxyphenyl)-isopropylidene] and the phenol-aldehyde condensation products. According to the teachings of the present invention, the preparation of a great variety of polyhydric phenols is possible, depending on the choice of polyhydric alcohol or polybasic acid for the reaction.

Examples I to VIII illustrate the preparation and the properties of resinous polyhydric phenols suitable for use herein. The procedure used in preparing these resinous polyhydric phenols consists in all cases of heating the reaction mixtures with continuous agitation at temperatures of from 190–250° C. until the acid values indicated satisfactory esterification. In all cases an inert gas was bubbled through the reaction mixture during esterification, and the water was removed by distillation as formed.

*Example I*

A mixture of 1 mol of 4,4-bis(4-hydroxyphenyl)-pentanoic acid, 0.5 mol succinic anhydride, and 1.1 mols of ethylene glycol was esterified to give an acid value of 8, softening point of 112° C., and a saponification value of 317. The saponification value is defined as the number of milligrams of KOH required to saponify a one-gram sample. The softening points were measured by Durrans' Mercury Method (Journal of Oil and Colour Chemists Assoc. 12, 173–175 (1929)).

*Example II*

A mixture of 2 mols of 4,4-bis(4-hydroxyphenyl)-pentanoic acid, 0.5 mol phthalic anhydride, and 1.1 mols glycerol was esterified to an acid value of 6.3 to give a product having a softening point of 113° C., and a saponification value of 259.

*Example III*

A mixture of 2 mols of 4,4-bis(4-hydroxyphenyl)-pentanoic acid, 0.5 mol azelaic acid, and 1.1 mols glycerol esterified to an acid value of 4.29 gave a product having a softening point of 97° C. and a saponification value of 257.

*Example IV*

A mixture of 2 mols of 4,4-bis(4-hydroxyphenyl)-pentanoic acid, 0.5 mol maleic anhydride, and 1.1 mols glycerol esterified to an acid value of 5.3 gave a product having a softening point of 134° C. and a saponification value of 276.

*Example V*

A mixture of 3 mols of 4,4-bis(4-hydroxyphenyl)-pentanoic acid, 0.5 mol azelaic acid, and 1.1 mols pentaerythritol was esterified, yielding after 5 hours, a product having an acid value of 8 and a softening point of 143° C.

*Example VI*

A mixture of 2 mols of 4,4-bis(4-hydroxyphenyl)-pentanoic acid, 0.5 mol azelaic acid, and 1.1 mols sorbitol was esterified to an acid value of 10 to give a product having a softening point of 114° C.

*Example VII*

A mixture of 1 mol of 4,4-bis(4-hydroxyphenyl)-pentanoic acid, 0.5 mol azelaic acid, and 1.1 mols diethanolamine was esterified to an acid value of 38 to give a product having a softening point of 103° C.

*Example VIII*

A mixture of 1 mol of 4,4-bis(4-hydroxyphenyl)-pentanoic acid, 0.5 mol Emery's Dimer Acid #955, and 1.1 mols ethylene glycol esterified to an acid value of 2.4 gave a product having a softening point of 54° C. and a saponification value of 192.

The mixed esters or polyhydric phenols above described are particularly valuable in preparing synthetic drying compositions by the esterification of the phenolic hydroxyl groups with unsaturated acids containing about 10 or more carbon atoms per molecule. Compositions of this nature may be illustrated by the reaction product of 10-undecenoic acid with the mixed ester illustrated by Formula I.

$8CH_2=CH(CH_2)_8CO_2H + 8(CH_3C=O)_2Q + (I) \longrightarrow$

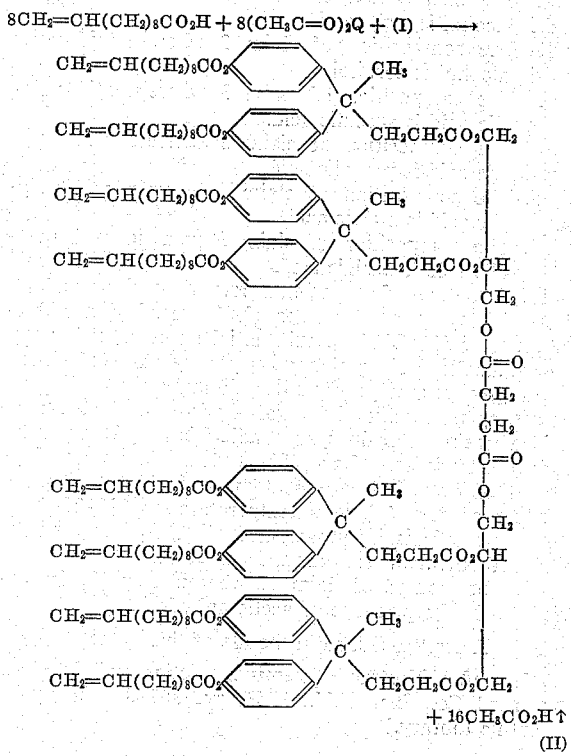

$+ 16CH_3CO_2H \uparrow$ (II)

The long-chain acids which are contemplated for use in preparing the synthetic esters of this invention include the unsaturated acids of at least about 10 carbon atoms and mixtures thereof. Illustrative of such acids are the drying oil fatty acids which normally contain from 18 to 22 carbon atoms such as acids obtained by the saponification of naturally-occurring, unsaturated vegetable oils including China-wood oil, oiticica oil, linseed oil, soyabean oil, corn oil and cottonseed oil. The fish oils constitute another important source of operable unsaturated acids. These materials, derived principally from the menhaden and the sardine, contain the glycerides of highly unsaturated acids and have an iodine value ranging from about 130 to 190. Suitable acids may be produced by other synthetic means, for example, mixed linoleic acids may be obtained by saponifying dehydrated castor oil. Oleic acid may be used to prepare a linoleic acid by hydroxylating the same to form dihydroxystearic acid, followed by dehydration of the latter. Lower molecular weight unsaturated acids may also be used if only air-drying characteristics are desired, but those containing less than about 10 carbon atoms contribute little plasticization. An example of one of the lower plasticizing acids contemplated is undecenoic acid, a commercially available material from the decomposition of castor oil acids.

Esterification of the polyhydric phenols is carried out by methods well known in the art. The method may consist of treating the polyhydric phenols with the acid chlorides of the desired unsaturated long-chain acid, liberating HCl as the ester is formed. The esterification may also be conveniently carried out by treating the polyhydric phenol with the long-chain unsaturated acid and acetic anhydride, the latter being used in a molar amount equivalent to or slightly in excess of the amount of long-chain unsaturated acid used, and heating the mixtures at temperatures sufficient to remove by distillation any unreacted acetic anhydride as well as acetic acid formed in the process.

The utility of the subject polyhydric phenol esters will become apparent from the examples set forth hereinbelow. They are superior ingredients in coating compositions, imparting resinous properties together with air-drying or heat-conversion characteristics. Films containing the compositions of this invention are characterized by outstanding durability, resisting breakdown for prolonged periods when exposed to boiling water or alkaline solutions.

Examples IX to XII illustrate the preparation of the subject polyhydric phenol esters by esterification of resinous polyhydric phenols with long-chain unsaturated acids. The method used in preparing these esters consisted of heating a mixture of the resinous polyhydric phenol with the long-chain unsaturated acid and acetic anhydride in an amount at least equimolar to the amount of long-chain unsaturated acid used, at temperatures varying from 190–250° C. The mixture was continuously agitated under conditions which permit removal by distillation of the unreacted acetic anhydride as well as acetic acid formed in the process. A continuous stream of inert gas was bubbled through the reaction mixture throughout the heating period in order to minimize oxidation and facilitate water removal. Proportions expressed refer to parts by weight, unless otherwise indicated.

*Example IX*

A mixture of 74 parts of the resinous polyhydric phenol from Example I and 56 parts of soyabean oil acids was esterified to an acid value of 4, and dissolved in heavy naphtha (boiling range 145–225° C. and having an aniline point of 60° C.) at 40% nonvolatile to give a viscosity of X (bubble viscosimeter). This varnish was treated with .03% cobalt drier based on the nonvolatile content to give a product which when spread in .002" wet film thickness and air-dried overnight gave a tack-free film. The same film, cured to a tack-free flexible product by baking for 30 minutes at 150° C., showed no film breakdown on exposure to 5% aqueous NaOH for a period of 4½ hours at room temperature.

*Example X*

A mixture of 68 parts of the resinous polyhydric phenol from Example II and 84 parts of soyabean oil acids esterified to an acid value of 4, dissolved in heavy naphtha, gave a viscosity of A–3 at 40% nonvolatile. Treatment of this product with .03% cobalt drier based on nonvolatile content gave .002" wet films which on curing for 30 minutes at 150° C. gave tack-free surfaces which were unaffected by exposure to boiling water for a period of 6 hours.

*Example XI*

A mixture of 67 parts of the resinous polyhydric phenol from Example IV and 84 parts of linseed oil acids was esterified to an acid value of 11 and dissolved to 40% nonvolatile in heavy naphtha to give a viscosity of D. Treatment with .03% cobalt drier on nonvolatile content gave a varnish which when spread in .002" wet film thickness and air-dried for 48 hours gave a surface which was unaffected by exposure to boiling water for a period of 2½ hours. The same film cured for ½ hour at 150° C. showed no deterioration on exposure to 5% NaOH for a period of 25 hours at room temperature.

*Example XII*

A mixture of 78 parts of the resinous polyhydric phenol of Example VI and 84 parts of soyabean oil acids was esterified to an acid value of 4.5. This product dissolved in heavy naphtha to a nonvolatile content of 40% gave a viscosity of A. Thin films of .002" wet film thickness baked for 30 minutes at 150° C. gave surfaces which showed no deterioration on exposure to boiling water for a period of 2½ hours or to aqueous 5% NaOH for a period of 2 hours at room temperature.

It is to be understood that the above examples are intended to be illustrative only. They should not be

What is claimed is:

1. A new composition of matter comprising the ester of (A) an ethylenically unsaturated aliphatic monocarboxylic acid having at least about 10 carbon atoms with (B) the ester of a polyhydric alcohol having alcoholic hydroxyls as the sole reactive groups and (1) at least one polycarboxylic acid and (2) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

2. The composition of claim 1 wherein the pentanoic acid consists essentially of 4,4 bis(4-hydroxyaryl)pentanoic acid wherein the hydroxyaryl radical is a hydroxyphenyl radical and is free from substituents other than alkyl groups of one carbon atom.

3. The composition of claim 1 wherein the pentanoic acid is 4,4 bis(4-hydroxyphenyl)pentanoic acid.

4. The composition of claim 3 wherein said monocarboxylic acid is a vegetable oil acid.

5. The composition of claim 3 wherein said monocarboxylic acid is fish oil fatty acids.

6. The composition of claim 3 wherein said monocarboxylic acid is soyabean oil acids.

7. The composition of claim 3 wherein said monocarboxylic acid is linseed oil acids.

8. The composition of claim 3 wherein said monocarboxylic acid is dehydrated castor oil acids.

9. The composition of claim 3 wherein said monocarboxylic acid is oleic acid.

10. The composition of claim 3 wherein said polyhydric alcohol is a glycol.

11. The composition of claim 3 wherein said polyhydric alcohol is a glycerol.

12. The composition of claim 3 wherein said polyhydric alcohol is sorbitol.

13. The composition of claim 3 wherein said polycarboxylic acid is succinic acid.

14. The composition of claim 3 wherein said polycarboxylic acid is phthalic acid.

15. The composition of claim 3 wherein said polycarboxylic acid is maleic acid.

16. The composition of claim 3 wherein said polycarboxylic acid is azelaic acid.

17. A method of preparing a new composition of matter which comprises the steps of (1) reacting at a temperature of 190–250° C. substantial amounts of a polyhydric alcohol having alcoholic hydroxyls as the sole reactive groups, a polycarboxylic acid and a pentanoic acid consisting essentially of 4,4 bis(4-hydroxyaryl)-pentanoic acid wherein the hydroxyaryl radical is a hydroxyphenyl radical and is free from substituents other than alkyl groups of from 1–5 carbon atoms and (2) reacting the product of step (1) at a temperature of 190–250° C. with an ethylenically unsaturated aliphatic monocarboxylic acid having at least about 10 carbon atoms.

18. The method of claim 17 wherein step (2) is carried out in the presence of acetic anhydride.

References Cited in the file of this patent

"The Van Nostrand Chemist's Dictionary," D. Van Nostrand Co., Inc., N.Y., 1953, pp. 367–8. (Copy in Scientific Library.)

UNITED STATES PATENT OFFICE
CERTIFICATE OF CORRECTION

Patent No. 2,907,736 October 6, 1959

Sylvan O. Greenlee

It is hereby certified that error appears in the printed specification of the above numbered patent requiring correction and that the said Letters Patent should read as corrected below.

Column 1, line 51, after "resin" insert -- acids --; column 2, line 51, for "supstituted" read -- substituted --; column 5, line 5, Equation II, right-hand portion of the equation relating to acetic anhydride should appear as shown below instead of as in the patent:

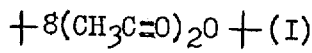

Signed and sealed this 17th day of May 1960.

(SEAL)
Attest:

KARL H. AXLINE
Attesting Officer

ROBERT C. WATSON
Commissioner of Patents